(12) United States Patent
John

(10) Patent No.: US 12,555,899 B2
(45) Date of Patent: Feb. 17, 2026

(54) RADAR SENSOR

(71) Applicant: HELLA GmbH & Co. KGaA, Lippstadt (DE)

(72) Inventor: Andreas John, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 327 days.

(21) Appl. No.: 18/136,631

(22) Filed: Apr. 19, 2023

(65) Prior Publication Data

US 2023/0261369 A1    Aug. 17, 2023

Related U.S. Application Data

(63) Continuation of application No. PCT/EP2021/077396, filed on Oct. 5, 2021.

(30) Foreign Application Priority Data

Oct. 20, 2020  (DE) .................... 10 2020 127 531.5

(51) Int. Cl.
*G01S 7/02* (2006.01)
*H01Q 1/42* (2006.01)

(52) U.S. Cl.
CPC ............ *H01Q 1/425* (2013.01); *G01S 7/027* (2021.05)

(58) Field of Classification Search
CPC .. H01Q 1/425; H01Q 1/42; G01S 7/03; G01S 7/027
See application file for complete search history.

(56) References Cited

U.S. PATENT DOCUMENTS

| | | | |
|---|---|---|---|
| 7,692,588 B2 | 4/2010 | Beer et al. | |
| 11,604,273 B2 | 3/2023 | Wintermantel | |
| 2005/0225481 A1* | 10/2005 | Bonthron | H01Q 21/0093 342/175 |

(Continued)

FOREIGN PATENT DOCUMENTS

| | | | |
|---|---|---|---|
| CN | 104833956 A | * | 8/2015 |
| DE | 102006023123 A1 | | 1/2007 |

(Continued)

OTHER PUBLICATIONS

International Search Report dated Feb. 11, 2022 in corresponding application PCT/EP2021/077396.

*Primary Examiner* — Robert W Hodge
*Assistant Examiner* — Bongani Jabulani Mashele
(74) *Attorney, Agent, or Firm* — Muncy, Geissler, Olds & Lowe, P.C.

(57) ABSTRACT

A radar sensor for reception of radar waves. The radar sensor includes at least one control unit and at least one circuit board. The at least one circuit board includes a substrate and a structure that is arranged on the substrate and has a multiplicity of metallization structures. The radar sensor is configured to be arranged on a radome in such a manner that the substrate is arranged on a side facing away from the radome and the structure is arranged between the radome and the substrate. The at least one control unit is arranged on a side of the substrate facing away from the radome and is in communicative connection with the at least one circuit board. At least one opening is made in the structure and only ambient medium is present between the radome and the at least one opening.

10 Claims, 2 Drawing Sheets

(56) References Cited

U.S. PATENT DOCUMENTS

| | | | |
|---|---|---|---|
| 2020/0137913 A1 | 4/2020 | Woehlte | |
| 2020/0220273 A1* | 7/2020 | Ahmadloo | H01Q 21/0043 |
| 2020/0221599 A1* | 7/2020 | Mai | H05K 5/0052 |
| 2021/0194115 A1 | 6/2021 | Wintermantel | |

FOREIGN PATENT DOCUMENTS

| | | |
|---|---|---|
| DE | 102018203106 A1 | 9/2019 |
| DE | 102018215393 A1 | 3/2020 |

* cited by examiner the other side of the substrate, which is to say is located opposite the side of the substrate that is facing away from the radome.

RADAR SENSOR

This nonprovisional application is a continuation of International Application No PCT/EP2021/077396, which was filed on Oct. 5, 2021, and which claims priority to German Patent Application No 10 2020 127 531.5, which was filed in Germany on Oct. 20, 2020, and which are both herein incorporated by reference.

BACKGROUND OF THE INVENTION

Field of the Invention

The present invention relates to a radar sensor, a radar system, and a production method for producing a radar system.

Description of the Background Art

Radar systems are used in particular to measure distance to an object. To do so, radar waves are transmitted into an environment, and a transit time of radar waves reflected by an object is measured.

Modern radar systems must meet demanding requirements for high-frequency transmission and reception performance, electromagnetic emissions, heating, energy efficiency, and cost efficiency.

Known structures of radar systems are based on an arrangement in which a high-frequency substrate is oriented toward a specific radome, which is to say is arranged facing the radome. If the HF integrated circuit for connecting the antennas is then likewise arranged toward the radome, then its EMC protection and its cooling require additional effort. Accordingly, when the high-frequency substrate is oriented toward the radome, a conflict of goals arises in which selected requirements are met especially well at the expense of other requirements.

For example, US 2020 220273 A1 describes a radar system in which a microcontroller and a high-frequency switch are in contact with a substrate of a circuit board structure. In this design, the high-frequency switch is arranged in an intermediate space between the substrate and a radome, as a result of which power losses can be caused during the transmission and reception of high-frequency signals.

SUMMARY OF THE INVENTION

It is therefore an object of the present invention to provide a radar sensor for a radar system that simultaneously meets the most demanding requirements for high-frequency transmission and reception performance, electromagnetic emissions, heating, energy efficiency, and cost efficiency. In particular, it is an object of the present invention to provide a radar sensor that simultaneously meets the above-mentioned requirements in operation with radar signals in the frequency range between 76-81 GHz.

In an exemplary embodiment, the present invention relates to a radar sensor for transmitting and receiving radar waves. The radar sensor can include at least one control unit and at least one circuit board, wherein the at least one circuit board includes a substrate and a structure that is arranged on the substrate and has a multiplicity of metallization structures. The radar sensor is configured to be arranged on a radome in such a manner that the substrate is arranged on a side facing away from the radome and the structure is arranged between the radome and the substrate. The at least one control unit is arranged on a side of the substrate facing away from the radome and is in communicative connection with the at least one circuit board. At least one opening is made in the structure, wherein only ambient medium is present between the radome and the at least one opening.

In the context of the present invention, a structure of a circuit board can be understood to be a construction formed on a substrate of the circuit board, in particular a number of metallization layers with appropriate conductor tracks and electronic components.

The substrate of the circuit board of the present radar sensor can be, in particular, a so-called "high-frequency substrate" or a substrate of a so-called "high-frequency circuit board," which is distinguished by conductor tracks optimized especially for high-frequency applications and by materials with an appropriately optimized dielectric constant and minimal impedance.

In the context of the present invention, a radome can be understood to be an outer shell of a radar system that is in contact with an environment and is permeable to radar waves.

As a result of the structure and the consequent orientation of relevant components of the radar sensor according to the invention relative to a radome, in combination with the at least one opening provided according to the invention, the most demanding requirements for high-frequency transmission and reception performance, electromagnetic emissions, thermal emissions, energy efficiency, and cost efficiency are all met simultaneously.

The at least one opening provided according to the invention in the structure of the circuit board functions as a wide-band waveguide antenna that conducts radar signals into the radar sensor, which is to say in particular onto the substrate of the circuit board, which functions as a high-frequency active surface. Accordingly, when the present radar sensor is used, it is possible to dispense with additional antennas such as, e.g., so-called "patch antennas."

The arrangement of the structure of the circuit board of the radar sensor between the substrate and a specific radome minimizes an attenuation effect by the substrate for radar waves incident on the radar sensor, and accordingly maximizes a reception performance of the radar sensor. Accordingly, a very wide frequency band with, e.g., radar signals in the frequency range between 76-81 GHz can be used.

Provision can be made that all control units in communicative connection with the substrate are thermally coupled to at least one heat sink that is arranged spaced apart from the substrate on a side of the substrate opposite the structure.

An arrangement of the control units in question on a side of the substrate opposite the structure permits space-saving thermal control of the control units by means of only one common heat sink.

Owing to an arrangement of a control unit, such as, e.g., a microcontroller, a processor, an ASIC, or any other programmed component directly on the substrate of the circuit board provided according to the invention, line lengths and corresponding line losses can be minimized in a communication between the at least one control unit and respective components of the circuit board.

Provision can additionally be made that the at least one opening is metallized at its surface.

A metallization of the at least one opening maximizes the action as an antenna of the at least one opening by minimizing a power dissipation of radar waves that radiate through the opening.

Provision can additionally be made that a metallization for shielding from electromagnetic radiation is arranged on an outside of the structure of the circuit board provided according to the invention, facing away from the substrate or facing toward a specific radome.

By means of a shielding on an outside of the structure of the circuit board of the present radar sensor, a so-called "electromagnetic compatibility" can be maximized, which is to say an interference power emitted by the radar sensor for other devices can be minimized. In this case, the shielding can be composed of a metallization layer of the circuit board itself, so that no additional material for shielding need be introduced into the circuit board or applied to the circuit board, and the radar sensor can accordingly be produced in a cost-effective manner. Accordingly, a metallization of the outside of the structure of the circuit board of the present radar sensor brings about an improvement in the immunity with respect to externally incident radiated interference, so-called "EMI optimization," without additional EMI filters.

Provision can additionally be made that the structure is an FR4 circuit board.

FR4 circuit boards are available as standard components in all electronic devices and accordingly are more cost-effective to produce than special components.

The present invention also relates to a radar system for transmitting and receiving radar waves. The radar system includes a possible embodiment of the present radar sensor and a radome, wherein a substrate of a circuit board of the radar sensor is arranged on a side facing away from the radome and a structure of the circuit board of the radar sensor is arranged between the radome and the substrate.

Provision can be made that the radar system includes a body that includes a receptacle for arrangement of the radar sensor, wherein the receptacle is configured to orient the radar sensor relative to the radome in such a manner that the substrate of the circuit board of the radar sensor is on the side facing away from the radome and the structure of the circuit board of the radar sensor is between the radome and the substrate.

By means of a receptacle, such as, e.g., a terminal strip, a simple and precise arrangement of the present radar sensor on a body of the present radar system can be achieved.

The present invention also relates to a production method for a radar system in which a possible embodiment of the present radar sensor is arranged on a body in such a manner that a substrate of a circuit board of the radar sensor is on a side facing away from a radome of the radar system and a structure of the circuit board of the radar sensor is between the radome and the substrate.

Provision can be made that at least one opening is made in the structure of the circuit board and is metallized at its surface.

In order to make the at least one opening in the structure, the structure can be processed independently or separately from the substrate, or together with the substrate, for example in a stamping process, milling process, or cutting process.

By introducing a metallization, i.e. a metal coating, in specific openings, so that the walls of the structure surrounding a specific opening are metallized, an action of the opening as a waveguide antenna can be maximized.

Provision can additionally be made that the structure is produced in a first production step independent of the a second production step for producing the substrate.

The components of the circuit board of the present radar sensor, which is to say the substrate and the structure, can be provided efficiently and rapidly by means of a production step for producing the structure that is independent of the production of a particular substrate and in which, e.g., openings are made in a structure. To make the holes in the structure, the structure can be stamped, cut, or milled, for example, and can then optionally be at least partially surrounded with a metallization layer, for example. In a further production step, a structure provided with openings can be connected to a substrate to form a circuit board.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
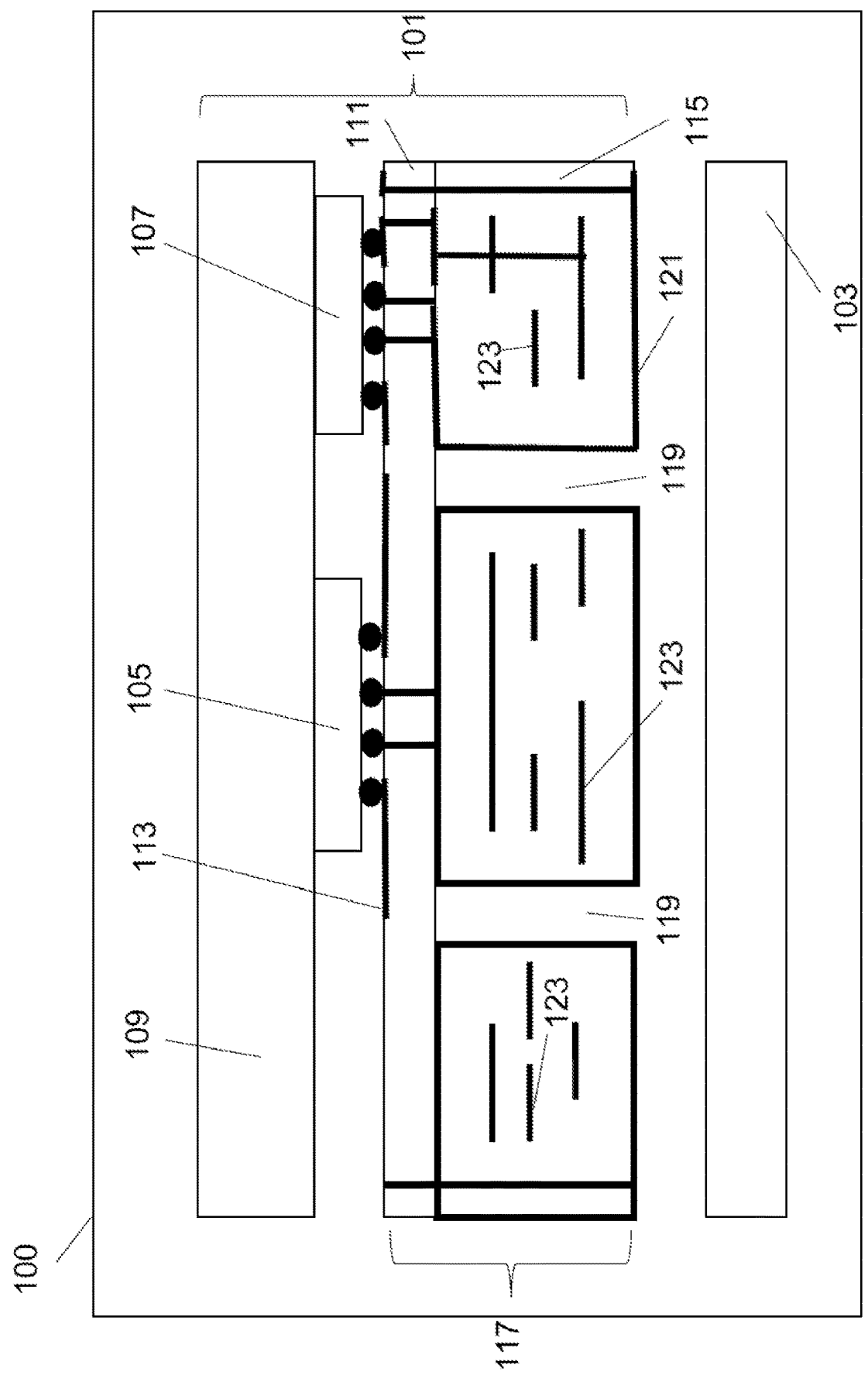
FIG. 1 shows an example of the present radar system with a present radar sensor.

Shown in FIG. 1 is a radar system 100. The radar system 100 includes a radar sensor 101 and a radome 103.

The radar sensor 101 includes a component 105 in the form of an integrated HF circuit for generating and processing HF signals and a control unit 107 in the form of an integrated circuit for controlling or regulating the radar sensor 101.

The component 105 and the control unit 107 are arranged on a metal body 109 for removing thermal energy from the component 105 and from the control unit 107.

The component 105 and the control unit 107 are each connected to a substrate 111 of the radar sensor 101 that acts as a carrier for the component 105 and the control unit 107, and are connected to waveguide antennas formed by respective openings 119 in a structure 115 of a circuit board 117 of the radar sensor.

The openings 119 can be filled with ambient medium such as, e.g., air.

An outer metallization or metallic coating 121 of the structure 115 of the circuit board 117 acts as shielding here from electromagnetic radiation, and therefore maximizes electromagnetic compatibility or minimizes electromagnetic emissions of the radar sensor 101.

Metallization structures 123 integrated into the structure 115 serve, in particular, to distribute low-frequency or digital signals within the structure 115 or the circuit board 117 and to supply power to components of the radar sensor 101, such as, e.g., the component 105.

The structure 115 is arranged on the substrate 111, and together with the substrate 111 forms the circuit board 117.

Figure 2:
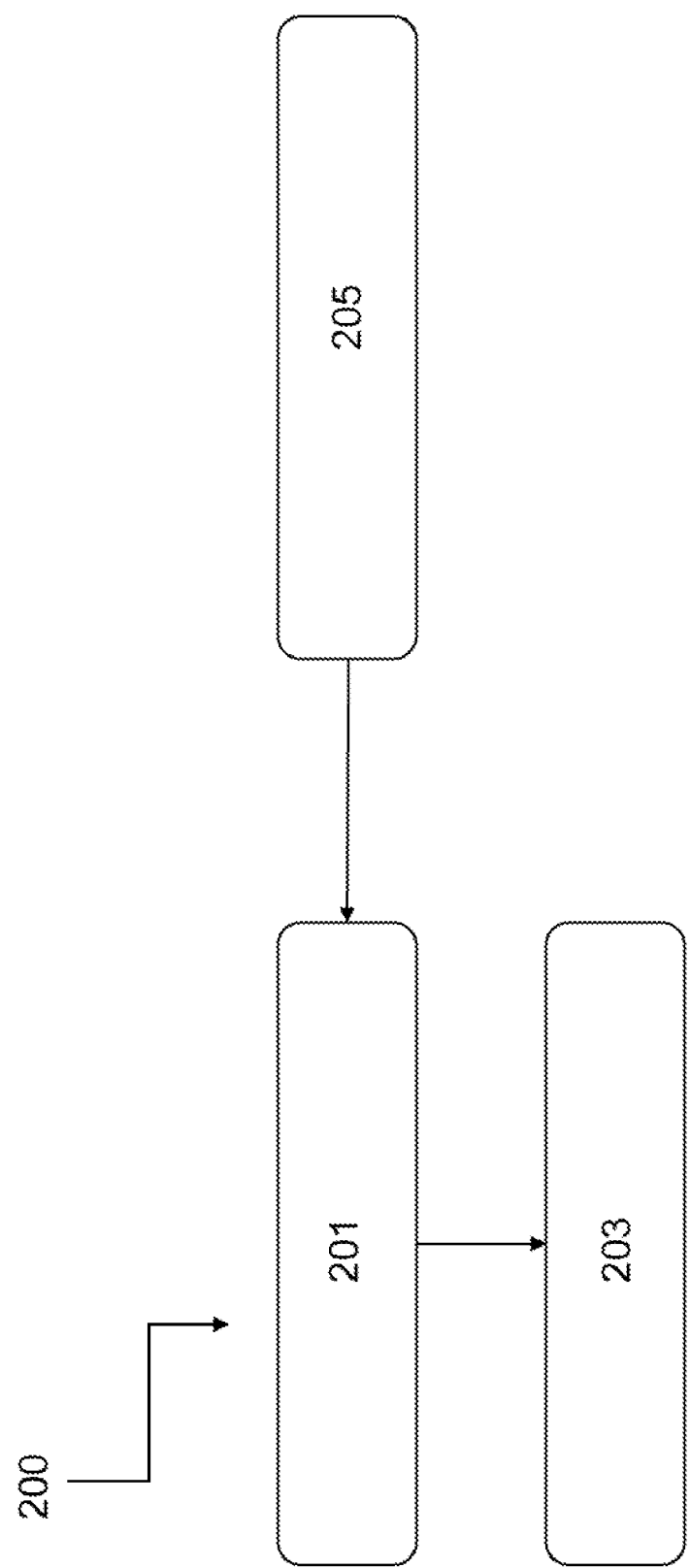
FIG. 2 shows an example of the present production process.

Shown in FIG. 2 is a production method 200. The production method 200 includes a provision step 201 for providing a radar sensor such as, e.g., the radar sensor 101 according to FIG. 1, and a body as well as a radome such as, e.g., the radome 103 according to FIG. 1.

In a joining step 203, the radar sensor 101 is inserted into a receptacle of the body. In this case, the receptacle is designed such that the radar sensor 101 can only be inserted into the receptacle in such a manner that the structure 115 of the radar sensor 101 is arranged between the substrate 111, which can be a high-frequency substrate, for example, and the radome 103.

In an optional opening step 205, at least one opening can be made in a structure formed of metallization layers or metallization structures. To this end, the at least one opening can be stamped, cut, or milled, for example. The structure with the at least one opening can then be arranged on a substrate, for example in order to form the radar sensor 101.

The invention being thus described, it will be obvious that the same may be varied in many ways. Such variations are not to be regarded as a departure from the spirit and scope of the invention, and all such modifications as would be obvious to one skilled in the art to be included within the scope of the following claims.

What is claimed is:

1. A radar sensor to transmit and receive radar waves, the radar sensor comprising:
    at least one control unit; and
    at least one circuit board comprising a substrate and a structure that is arranged on the substrate and has at least two metallization structures,
    wherein the radar sensor is configured to be arranged on a radome such that the substrate is arranged on a side of the at least one circuit board facing away from the radome and the structure is arranged between the radome and the substrate,
    wherein the at least one control unit is arranged on a side of the substrate facing away from the radome and is in communicative connection with the at least one circuit board,
    wherein at least one opening is made in the structure,
    wherein only an ambient medium is present between the radome and the at least one opening, and
    wherein a metallization for shielding from electromagnetic radiation is arranged on an outside of the structure facing away from the substrate.

2. The radar sensor according to claim 1, wherein a surface of the at least one opening is metallized.

3. The radar sensor according to claim 1, wherein the at least one control unit that is in communicative connection with the substrate is thermally coupled to at least one heat sink that is arranged spaced apart from the substrate on a side of the substrate opposite the structure.

4. The radar sensor according to claim 1, wherein the at least one circuit board comprises a printed circuit board with a high-frequency substrate as the substrate.

5. The radar sensor according to claim 1, wherein the structure is an FR4 circuit board.

6. A radar system to transmit and receive radar waves, the radar system comprising:
    the radar sensor according to claim 1; and
    the radome,
    wherein the substrate of the at least one circuit board of the radar sensor is arranged on the side of the at least one circuit board facing away from the radome, and the structure of the at least one circuit board of the radar sensor is arranged between the radome and the substrate.

7. The radar system according to claim 6, wherein the radar system includes a body that includes a receptacle for arrangement of the radar sensor, wherein the receptacle is configured to orient the radar sensor relative to the radome such that the substrate of the at least one circuit board of the radar sensor is on the side of the at least one circuit board facing away from the radome and the structure of the at least one circuit board of the radar sensor is between the radome and the substrate.

8. A production method for a radar system, the method comprising:
    arranging the radar sensor according to claim 1 on a body such that the substrate of at least one circuit board of the radar sensor is on the side of the at least one circuit board facing away from the radome of the radar system; and
    arranging the radar sensor on the body such that the structure of the at least one circuit board of the radar sensor is between the radome and the substrate.

9. The production method according to claim 8, wherein the at least one opening is made in the structure of the at least one circuit board and a surface of the at least one opening is metallized.

10. The production method according to claim 8, wherein the structure is produced in a first production step independent of a second production step for producing the substrate.

* * * * *